Figure 2:
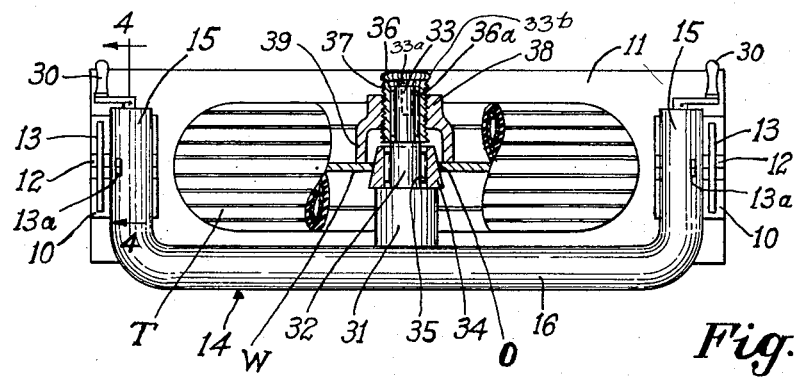

Feb. 9, 1954 R. L. WELCH 2,668,443
STATIC AND DYNAMIC WHEEL BALANCING MACHINE
Filed Jan. 25, 1951

Inventor
Robert L. Welch
By Prean, Bishop & Hamilton
Attorneys

Patented Feb. 9, 1954

2,668,443

UNITED STATES PATENT OFFICE 2,668,443

STATIC AND DYNAMIC WHEEL BALANCING MACHINE

Robert L. Welch, Canton, Ohio

Application January 25, 1951, Serial No. 207,773

7 Claims. (Cl. 73—66)

The invention relates to a wheel balancing machine especially designed for balancing automobile wheels with tires thereon and it is an object of the invention to provide such an apparatus which is of simple construction and easily operated so as for quickly and accurately determining the static balance and the dynamic balance of an automobile wheel and tire so that the same may be suitably counter-balanced to prevent excessive tire wear, wheel shimmy and similar unfavorable conditions.

It is known that machines have been made for both statically and dynamically balancing automobile wheels with tires thereon but all such machines which have been placed in use are of more or less complicated and expensive construction and in many cases require an expert to operate the same in order to statically and dynamically balance the wheel and determine how to properly counter-balance the same.

The present invention therefore contemplates a very simple, inexpensive and easily operated machine, which may be easily and readily operated by an inexperienced person, to both statically and dynamically balance an automobile wheel and its tire in such manner that it may be readily determined how the wheel should be properly counter-balanced to compensate for any static and/or dynamic unbalance therein.

Another object is to provide such a machine comprising a spaced pair of pedestals upon which a substantially U-shape cradle member, of tubing or the like, which is adjustably supported upon the pedestals, by means of adjustable V-shape knife blades resting in notches in the pedestals, the U-shape cradle member having a central rigid shaft thereon provided with a rotatable cone and a nut for mounting the wheel so that it may rotate upon the shaft.

Other objects include a fixed pointer upon one end of the U-shape frame cooperating with a calibrated sector mounted upon the corresponding pedestal and manual means for adjusting each V-shape knife blade upon the frame.

Figure 1:
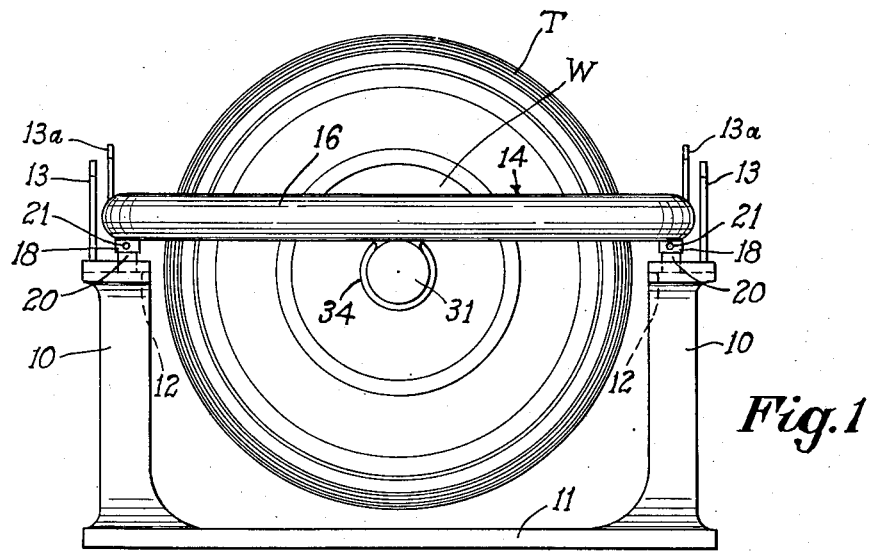
Figures 3, 4, 5:
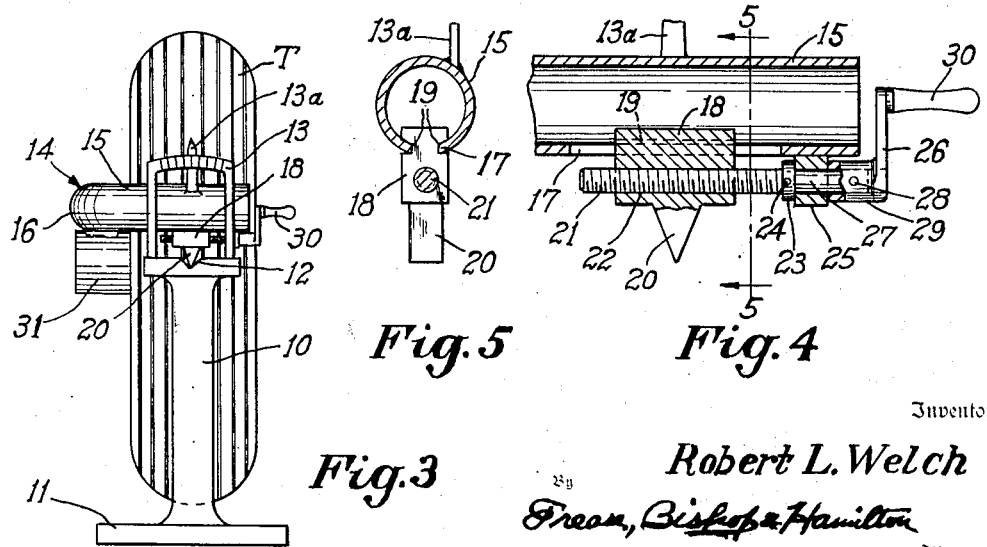

The above objects together with others which will be apparent from the drawing and following description, or which may be later referred to, may be attained by constructing the improved static and dynamic wheel balancing machine in the manner hereinafter described in detail and illustrated in the accompanying drawing, in which:

Figure 1 is a front elevation of a static and dynamic wheel balancing machine embodying the invention showing an automobile wheel with tire thereon mounted upon the machine;

Fig. 2 a top plan view of the machine with parts broken away for the purpose of illustration;

Fig. 3 an end view of the machine shown in Figs. 1 and 2;

Fig. 4 an enlarged detail sectional view of a portion of one arm of the U-shape cradle, showing the means for adjusting the V-shape knife blade, taken on the line 4—4, Fig. 2; and, Fig. 5 a section taken as on the line 5—5, Fig. 4.

Referring now more particularly to the embodiment of the invention illustrated in the accompanying drawing, in which similar numerals refer to similar parts throughout, the improved static and dynamic wheel balancing machine, to which the invention pertains, includes a spaced pair of pedestals, or uprights 10, which may be rigidly mounted in spaced relation upon a base 11 which may stand upon the floor, or upon a table or other horizontal surface, where the machine may be conveniently operated.

Each pedestal 10 has a wide V-shape notch 12 in its upper end. A calibrated sector 13 is rigidly mounted upon each pedestal 10, being centrally located with reference to the corresponding V-shape notch 12.

The cradle, upon which the automobile wheel with tire thereon is mounted, is in the form of a substantially U-shape frame indicated generally at 14, preferably formed of metal tubing and having the two relatively short legs 15 located perpendicular to the relatively elongated base portion 16 of the U-shape cradle.

Each leg 15 of the U-shape cradle has a longitudinal slot 17 in its underside within which is slidably mounted a block 18, of any suitable metal, having the opposed, longitudinal grooves 19 which receive the side walls of the slot 17. A V-shape knife blade 20 is integrally formed upon or rigidly attached to the adjustable block 18.

A vertically disposed, rigid, indicating hand or pointer 13a, is mounted adjustably upon one or both arms 15 of the cradle and adapted to co-operate with the corresponding calibrated sector 13 upon the adjacent pedestal, as best shown in Figs. 1, 2 and 3.

For the purpose of accurately adjusting each knife blade 20, with reference to the corresponding arm 15 of the U-shape cradle, an adjusting screw 21 is located through a threaded bore 22 in each block, the adjusting screw having a collar 23 fixed thereon, as by a pin 24, for rotatable contact with the journal bearing 25, which is fixed to the underside of the corresponding arm 15.

A crank handle 26 is fixed upon the outer, unthreaded portion 27 of the adjusting screw, as by a pin 28, the hub 29 of said crank arm having rotatable contact with the other side of the journal bearing 25, whereby, when the handle 30 of the crank arm is grasped for manually rotating the adjusting screw 21, the block 18, and with it, the corresponding V-shape knife 20, will be moved longitudinally of the arm 15 and may be accurately adjusted to any desired position relative to the arm and held in adjusted position.

Centrally located upon the elongated base portion 16 of the U-shape cradle is the rigid shaft 31, located perpendicular to the base portion 16 of the U-shape cradle, and in a horizontal plane below the legs 15 of the cradle.

As best shown in Figs. 1 and 3, the shaft 31 is so located with reference to the other parts of the apparatus that the axis of the shaft is in the same horizontal plane as the lower ends of the knife blades 20, so that the center or axis of the shaft 31 is located in the same horizontal plane as the pivot points of the cradle knife blades 20 in the V-shape notches 12 of the pedestals or supports 10.

The shaft 31 is reduced in diameter, as indicated at 32, and again further reduced in diameter as indicated at 33, and upon the first reduced portion 32 of the shaft is rotatably mounted a cone 34, any suitable and well known type of anti-friction bearing, such as the roller bearing indicated at 35, being interposed between the reduced portion 32 of the shaft and the cone, in order that the cone may freely and easily rotate thereon.

A cylindrical sleeve 36 is journalled upon the reduced end portion 33 of the shaft, as by the roller bearing 36a, said sleeve being provided with external screw threads 37 to receive the nut 38, which has an enlarged, hollow, cylindrical end portion 39 for a purpose to be later described.

The sleeve 36 and roller bearing 36a may be retained against removal from the reduced shaft portion 33 by any conventional means whereby the sleeve 36 will be rotatable upon the shaft but not movable longitudinally relative thereto.

This retaining means, as shown in Fig. 2, may comprise a screw 33a, threaded into a tapped bore in the outer end of the reduced terminal end 33 of the shaft 31, and provided with an enlarged head 33b contacting the outer end of the cylindrical sleeve 36 and preventing accidental removal of this sleeve and the roller bearing 36a.

In the operation of the machine, for correcting the static and dynamic unbalance of an automobile wheel, such as indicated generally at W, having a tire T thereon, the nut 38 is removed from the sleeve 36, and the wheel W is slipped over the externally threaded sleeve 36 and onto the cone 34.

The nut 38 is then replaced upon the sleeve 36, and tightened, the hollow, cylindrical portion 39 thereof engaging the central portion of the wheel, in a circle spaced from the usual central opening O in the wheel, so that the wheel is tightly clamped upon the cone 34. Thus, the wheel is not rotatable relative to the cone 34 and the sleeve 36, but turns therewith.

The cradle may be removed from the pedestal frame, for the purpose of attaching the wheel thereto, or may remain in position upon the frame, as shown in the drawing, with the knife blades 20 engaged in the notches 12 of the pedestals to support the cradle upon the pedestals.

The adjusting screws 21 may then be operated, by means of their respective cranks 26, so as to adjust both ends of the cradle relative to the respective pedestals to a position where the rigid, vertical, indicating hands, or pointers, 13a upon the arms of the cradle, are centrally located relative to the corresponding calibrated sectors 13 upon the adjacent pedestals.

As the wheel is thus very freely rotatable upon the shaft 31 of the cradle, through the anti-friction bearing mounted cone and sleeve, 34 and 36 respectively, the wheel is free to rotate upon the shaft until the heaviest point upon the wheel comes to the bottom. The wheel may be slowly rotated several times by the operator, so that each time he may note the tendency of the wheel to come to rest with a particular point at the bottom. This point is the heavy point which causes static unbalance of the wheel.

The operator then applies one or more counterweights, as in usual and well known practice, to the proper position on the wheel, to overcome this static unbalance, and may then check the wheel again upon the machine to see if it is then properly statically balanced.

In order to determine the dynamic balance of the wheel, the operator may then by hand turn the wheel slowly upon its axis so that it may make several revolutions around the shaft 31, observing the level of the cradle during this rotation of the wheel, by checking upon the readings of the indicating hands, or pointers 13a relative to the corresponding calibrated sectors 13, and if the wheel is dynamically unbalanced the cradle will be tilted with each revolution of the wheel, the entire cradle with wheel and tire thereon being balanced upon the two knife blades 20, resting in the notches 12.

If there is a heavy point upon one side of the wheel, causing dynamic unbalance, this will cause the cradle and wheel to tilt from the vertical position toward the horizontal position, as the heavy point upon the wheel passes below the center of the wheel, and continuing the rotation, as this heavy point is rotated above the plane of the cradle, the cradle will again tilt in the opposite direction.

By noting the amount of deflection of the cradle from the horizontal during this rotation of the wheel by reading the amount of deflection shown by the indicating hands 13a, upon the corresponding calibrated sectors 13, the operator is able to determine the amount and location of the counterweight necessary to overcome this dynamic unbalance of the wheel.

From the above it is obvious that a simple, inexpensive and easily operated wheel balancing machine is produced, for determining both static and dynamic unbalance of an automobile wheel with tire thereon, and for accurately showing the heavy point and the amount of counterweight necessary for restoring the wheel to both static and dynamic balance.

Although the invention is disclosed herein as especially adapted for balancing an automobile wheel, with rubber tire thereon, it should be understood that the apparatus is adapted for obtaining the static and dynamic balance of any type of wheel, or the like, with or without a tire thereon.

I claim:

1. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto said shaft being on the same side of the base portion as said legs, a freely rotatable cone upon said shaft, and means for clamping a wheel upon said freely rotatable cone, the central opening in the wheel receiving said cone.

2. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable cone upon said shaft, a freely rotatable sleeve upon the shaft beyond said freely rotatable cone, said sleeve being externally threaded and a nut upon said sleeve for clamping a wheel upon said freely rotatable cone, the central opening in the wheel receiving said cone.

3. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable cone upon the shaft, a freely rotatable sleeve upon the shaft beyond said cone, and means upon said sleeve for clamping a wheel upon said cone, the central opening in the wheel receiving said cone.

4. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, means for adjusting each knife blade longitudinally upon the corresponding leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable member upon said shaft, and means for clamping a wheel upon said freely rotatable member.

5. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, means for adjusting each knife blade longitudinally upon the corresponding leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable cone upon said shaft, and means for clamping a wheel upon said freely rotatable cone.

6. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, means for adjusting each knife blade longitudinally upon the corresponding leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable member upon said shaft, a freely rotatable sleeve upon the shaft beyond said freely rotatable member, said sleeve being externally threaded, and a nut upon said sleeve for clamping a wheel upon said freely rotatable member.

7. A static and dynamic wheel balancing machine comprising spaced supports each having a notch in its upper surface, a substantially U-shape cradle having an elongated base portion and a relatively short leg at each end thereof, said base portion and legs of the cradle being disposed in a horizontal plane, a depending knife blade upon each leg of the cradle, means for adjusting each knife blade longitudinally upon the corresponding leg of the cradle, said knife blades being engaged in the notches in the supports and being the only means for supporting the cradle upon the supports, an indicating hand upon each leg of the cradle, a calibrated sector upon each support cooperating with the corresponding indicating hand, a centrally located, normally horizontal shaft mounted upon the base of the cradle and perpendicular thereto, said shaft being on the same side of the base portion as said legs, a freely rotatable cone upon the shaft, a freely rotatable sleeve upon the shaft beyond said cone, and means upon said sleeve for clamping a wheel upon said cone.

ROBERT L. WELCH.

References Cited in the file of this patent

UNITED STATES PATENTS

| Number | Name | Date |
|---|---|---|
| 2,177,252 | Hanson | Oct. 24, 1939 |
| 2,214,758 | Bell | Sept. 17, 1940 |

FOREIGN PATENTS

| Number | Country | Date |
|---|---|---|
| 11,350 | Great Britain | 1914 |